United States Patent [19]

Sato et al.

[11] Patent Number: 4,510,538
[45] Date of Patent: Apr. 9, 1985

[54] MAGNETIC RECORDING APPARATUS

[75] Inventors: Seiji Sato, Yokohama; Koichi Takeuchi, Kamakura, both of Japan

[73] Assignee: Sony Corporation, Tokyo, Japan

[21] Appl. No.: 449,781

[22] Filed: Dec. 14, 1982

[30] Foreign Application Priority Data

Dec. 14, 1981 [JP] Japan .................. 56-201397

[51] Int. Cl.³ .............................................. G11B 5/52
[52] U.S. Cl. ........................................ 360/84; 360/9.1
[58] Field of Search ................... 360/8, 9.1, 84–85, 360/107

[56] References Cited

U.S. PATENT DOCUMENTS 3,157,738 11/1964 Okamura .......................... 360/9.1
4,358,799 11/1982 deNiet ................................ 360/84

FOREIGN PATENT DOCUMENTS 124409 10/1978 Japan .

Primary Examiner—A. J. Heinz
Attorney, Agent, or Firm—Lewis H. Eslinger; Alvin Sinderbrand

[57] ABSTRACT

A miniature helical scan video tape recorder (VTR) utilizes a reduced-diameter guide drum, but the video signals recorded thereby onto the tape have a standard track pattern and can be reproduced using a standard VTR having a guide drum of standard diameter $D_1$. In the miniature VTR, the tape is wrapped for a tape wrap angle $\alpha$ (e.g., substantially 300 degrees) at a still angle $\theta_2$, whereas the standard VTR uses a wrap angle of 180° and a still angle of $\theta_1$. In order to ensure that the miniature VTR achieves the same record track length $l'_N$ and recording angle $\theta_0$ as the standard VTR, the diameter $D_2$ of the miniature VTR is selected to satisfy the equation $$D_2 = \frac{1}{\pi} \sqrt{\left(\frac{360°}{\alpha} \cdot l'_N\right)^2 + \left(\frac{V}{f_V}\right)^2 + 2 \cdot \frac{360°}{\alpha} \cdot \frac{l'_N V}{f_V} \cos\theta_0} \ ;$$

where $f_V$ is the video field frequency. The still angle $\theta_2$ satisfies the equation $$O_2 = \arcsin\left(\frac{180°}{\alpha} \cdot \frac{D_1}{D_2} \sin\theta_1\right) \ , \text{ and}$$

the video signal to be recorded is given a non-standard horizontal scanning frequency $f'_H$ according to the relation $$f'_H = \frac{360°}{\alpha} f_H,$$

where $f_H$ is the standard horizontal scanning frequency. The recording head can be provided with two gaps for double-azimuth recording of the video signal.

12 Claims, 13 Drawing Figures

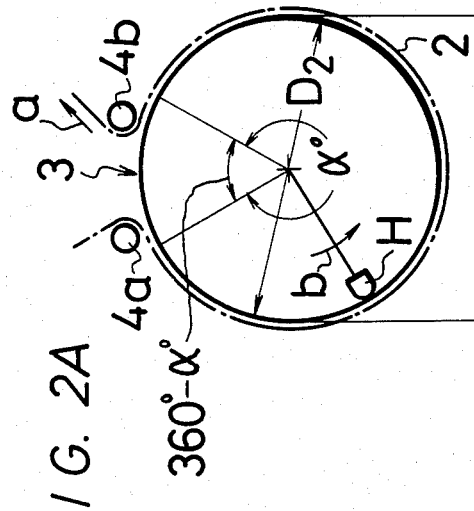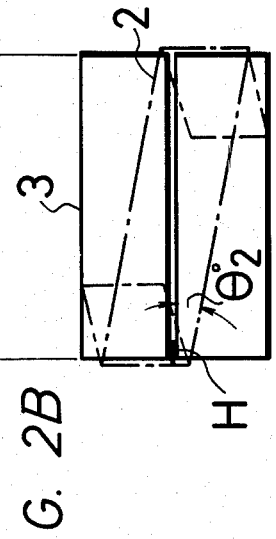
FIG. 1A  FIG. 2A
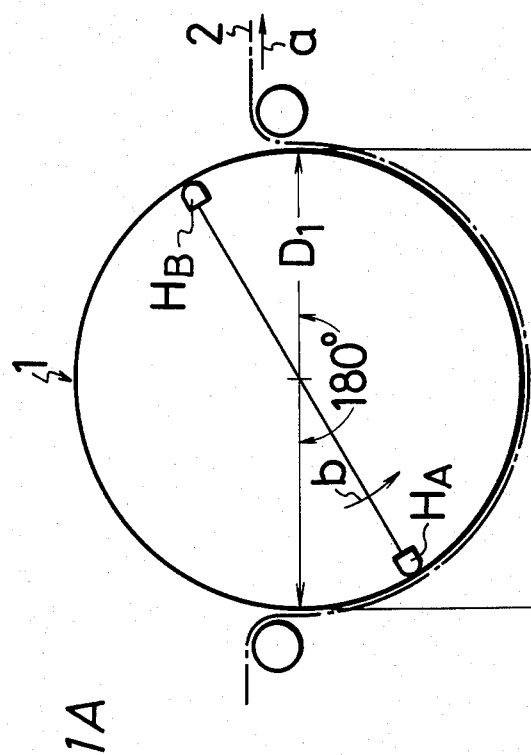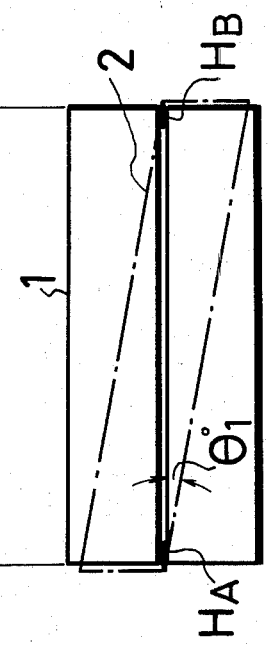
FIG. 1B  FIG. 2B

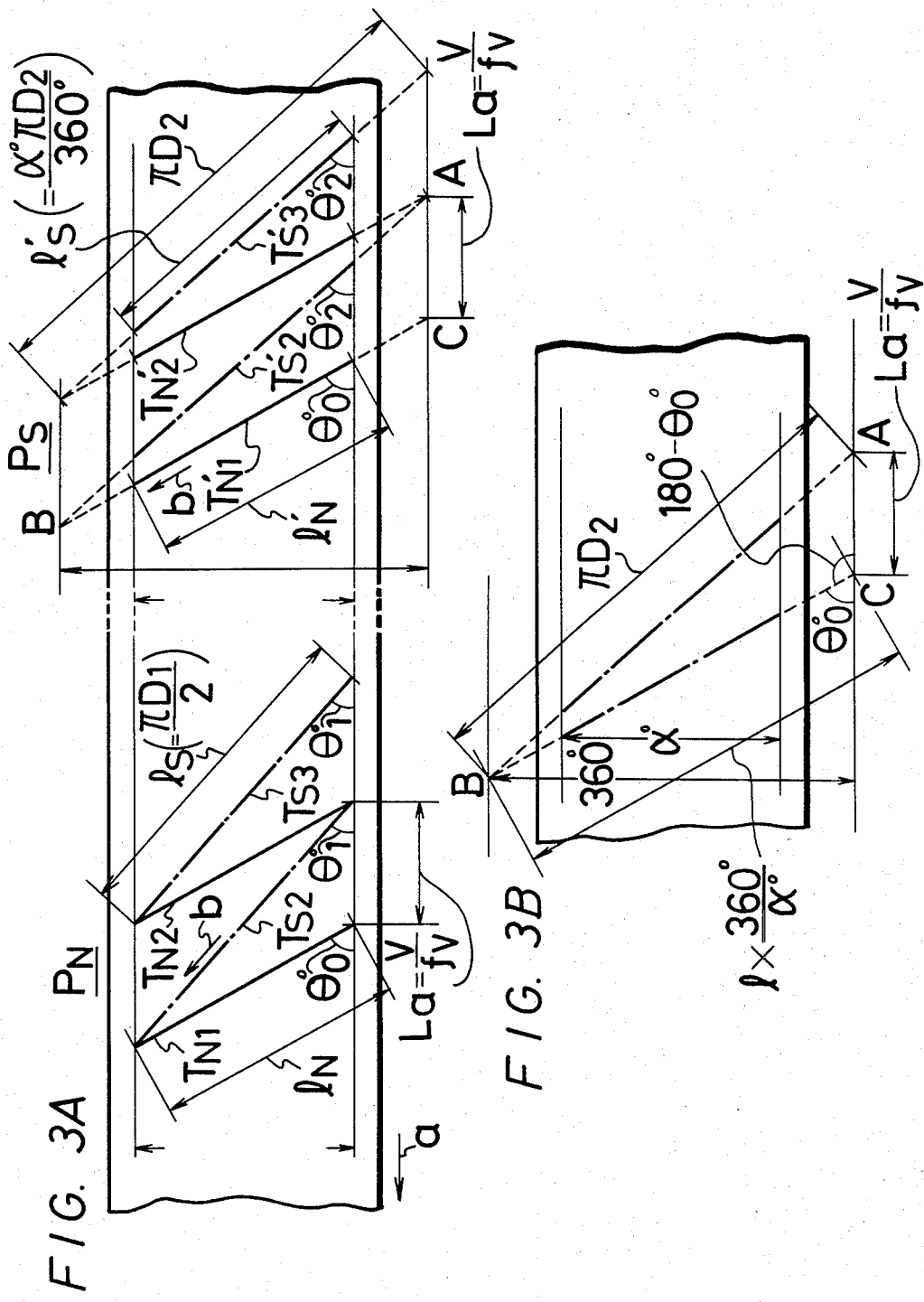

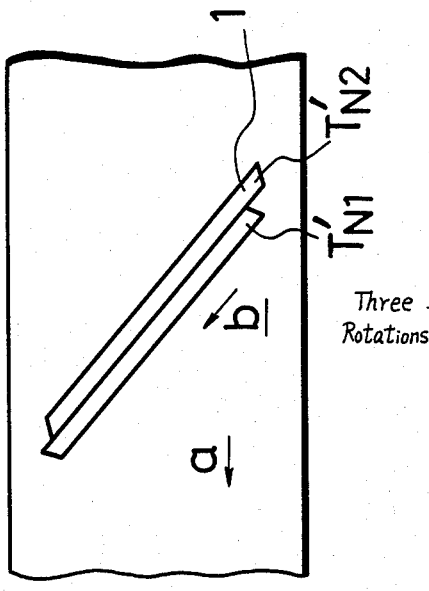
FIG. 5A
FIG. 5B
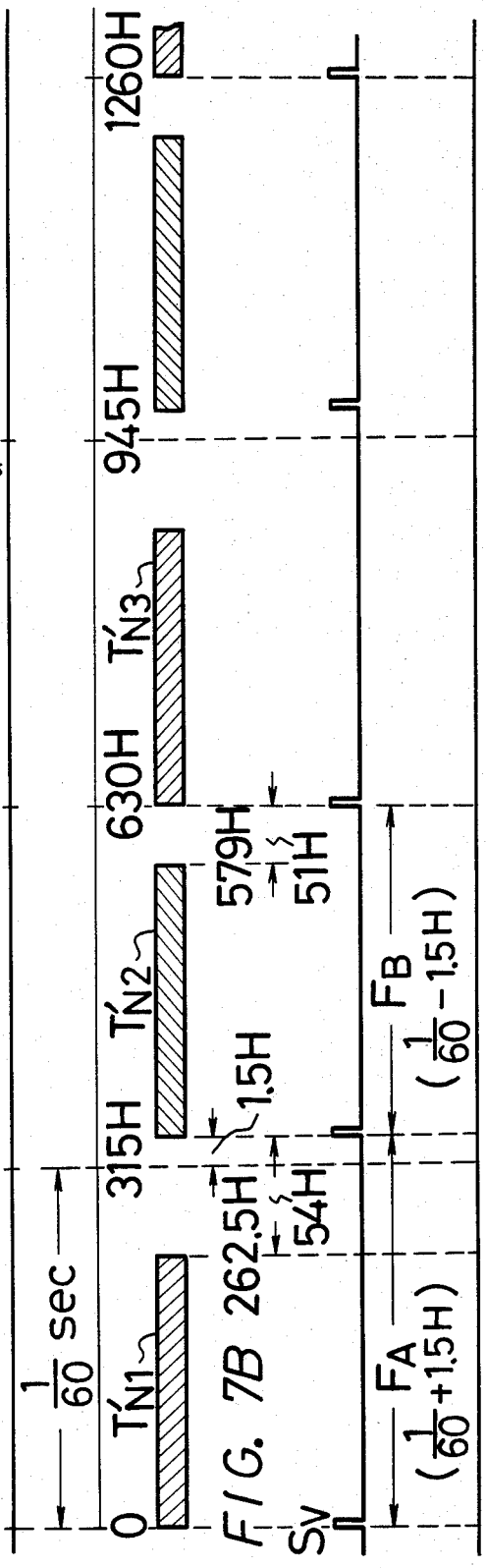
FIG. 7A
FIG. 7B

MAGNETIC RECORDING APPARATUS

BACKGROUND ON THE INVENTION

This invention relates to magnetic recording apparatus, and is more particularly directed to magnetic recording apparatus of reduced size which is suitable for use in a miniature video tape recorder, for example, in a combination television camera and video tape recorder formed as a unit.

A helical scan type video tape recorder (VTR) suitable, for example, for home use (referred to hereinafter as a standard VTR) is usually arranged to have video tape wrapped about a guide drum thereof for a wrap angle (i.e., a circumferential angle of the drum) of substantially 180°. A pair of magnetic heads are spaced 180° apart on the guide drum, and are used alternately to record the video signal in successive slant tracks on the tape. The magnetic heads are also used to pick up the video signal from recorded slant tracks on the tape. The tape is wrapped about the head drum at a so-called still angle relative to the plane of the magnetic heads about the drum.

Because the pattern of the recorded slant tracks depends on the wrap angle and the still angle of the tape wrapped about the drum, and also on the diameter of the drum, it follows that if the wrap angle is increased and the still angle changed, the diameter of the guide drum can be reduced, and the overall dimensions of the VTR can be reduced accordingly.

For example, if the wrap angle is increased from 180° to 300° and recording and playback of the video signal are carried out using a single rotary magnetic head, a reduced-diameter drum can be used, with a diameter only about 3/5 that of the standard VTR guide drum.

However, if such a reduced-diameter head drum is used, the resulting pattern of recorded slant tracks will be different from the pattern used with a standard VTR. Hence, prior proposals for miniature VTRs have been unable to use reduced-diameter head drums to record video signals on tape so that the signals could be readily picked up by playing the tape on a standard VTR. Conversely, tapes recorded on a standard VTR could not be played back on a previous miniature VTR having a reduced-diameter drum.

OBJECTS AND SUMMARY OF THE INVENTION

It is an object of this invention to provide a novel miniature magnetic video recording apparatus avoiding the drawbacks of the prior art.

It is another object of this invention to provide recording apparatus having a reduced-diameter guide drum, but which records video signals on magnetic tape such that the tape can be played back, without special problems, on a standard VTR.

It is a further object of this invention to provide a miniature video tape recorder (VTR) which is suitable to be used in combination with a television camera, such that the VTR and camera can be constructed as an integrated unit.

It is a still further object of this invention to provide a magnetic recording apparatus which can avoid frame jitter and jumping of the signal during successive video fields, and which can also avoid losses of picture synchronism of a reproduced video picture, for example, as may appear on a video monitor.

According to an aspect of this invention, a helical scan type magnetic recording apparatus has a rotary magnetic head with at least one magnetic gap and disposed on a reduced-size guide drum, or head drum, of a diameter $D_2$. Magnetic tape is wound over the circumference of the guide drum for a wrapping angle $\alpha$. The at least one rotary magnetic head records fields of a video signal in slant tracks on the tape arranged at a recording angle $\theta_0$ with respect to the longitudinal direction of the tape when the tape is advanced at a tape running speed $V_1$ with the length of the tracks being $l_N'$. The recorded fields of video signal have a standard vertical synchronizing frequency $f_V$. The tape recorded on the tape by the apparatus is compatible with standard video playback apparatus having a standard-sized rotary drum of diameter $D_1$, greater than the diameter $D_2$, and with the tape being wrapped thereabout for a wrapping angle of substantially 180° and at a still angle of $\theta_1$, such that the video signal played back from the standard VTR has the standard vertical frequency $f_V$ and the standard horizontal scanning frequency $F_H$.

In order to achieve this end, the diameter $D_2$ of the reduced-diameter guid drum is selected to satisfy the equation $$D_2 = \frac{1}{\pi}\sqrt{\left(\frac{360°}{\alpha} \cdot l_N\right)^2 + \left(\frac{V}{f_V}\right)^2 + 2 \cdot \frac{360°}{\alpha} \cdot \frac{l_N'V}{f_V} \cos\theta_0} \,.$$

The tape is wrapped about the reduced-diameter guide drum at a still angle of $\theta_2$ selected to satisfy the equation $$\theta_2 = \arcsin\left(\frac{180°}{\alpha} \cdot \frac{D_1}{D_2} \cdot \sin\theta_1\right) \,.$$

Also, the video signal to be recorded is provided to the at least one head so as to have a non-standard horizontal scanning frequency $f'_H$ selected to satisfy the equation $$f_{H'} = \frac{360°}{\alpha} f_H.$$

In order to record video signals in a guard-bandless format, the at least one magnetic head has first and second gaps with different azimuth angles and separated one behind the other by an amount corresponding, e.g., to 1.5 horizontal scanning intervals. The first gap is used to record alternate fields of the video signal and the second gap is used to record the remaining fields. In order to ensure that the video signal is recorded with the proper timing so that it can be picked up by a standard, two-head VTR, a delay circuit is provided so that the video signal recorded by the second gap (i.e. every other field) is delayed by an amount (e.g., 1.5 horizontal scanning intervals) to correspond to the separation between the first and second gaps.

The miniature VTR according to this invention can be constructed to be used with video signals according to either of the NTSC and CCIR systems.

The above and many other objects, features, and advantages of this invention will become apparent from the ensuing detailed description, when considered in connection with the accompanying drawings.

BRIEF DESCRIPTION OF THE DRAWING

FIGS. 1A and 1B are plan and elevational views, respectively, of a rotary magnetic head assembly of a conventional standard video tape recorder (VTR).

FIGS. 2A to 2B are plan and elevational views, respectively, of a reduced-diameter rotary magnetic head assembly associated with a miniature VTR according to an embodiment this invention.

FIGS. 3A and 3B illustrate patterns of video signals recorded on tape with a standard VTR and with a miniature VTR according to this invention.

FIGS. 5A illustrates detail of the magnetic head assembly of FIG. 5.

FIG. 5B illustrates the recording of signals with the magnetic head assembly of FIG. 5.

FIGS. 7A and 7B are time charts for explaining the operation of the combination of FIG. 6.

DETAILED DESCRIPTION OF THE PREFERRED EMBODIMENTS

Figure 4:
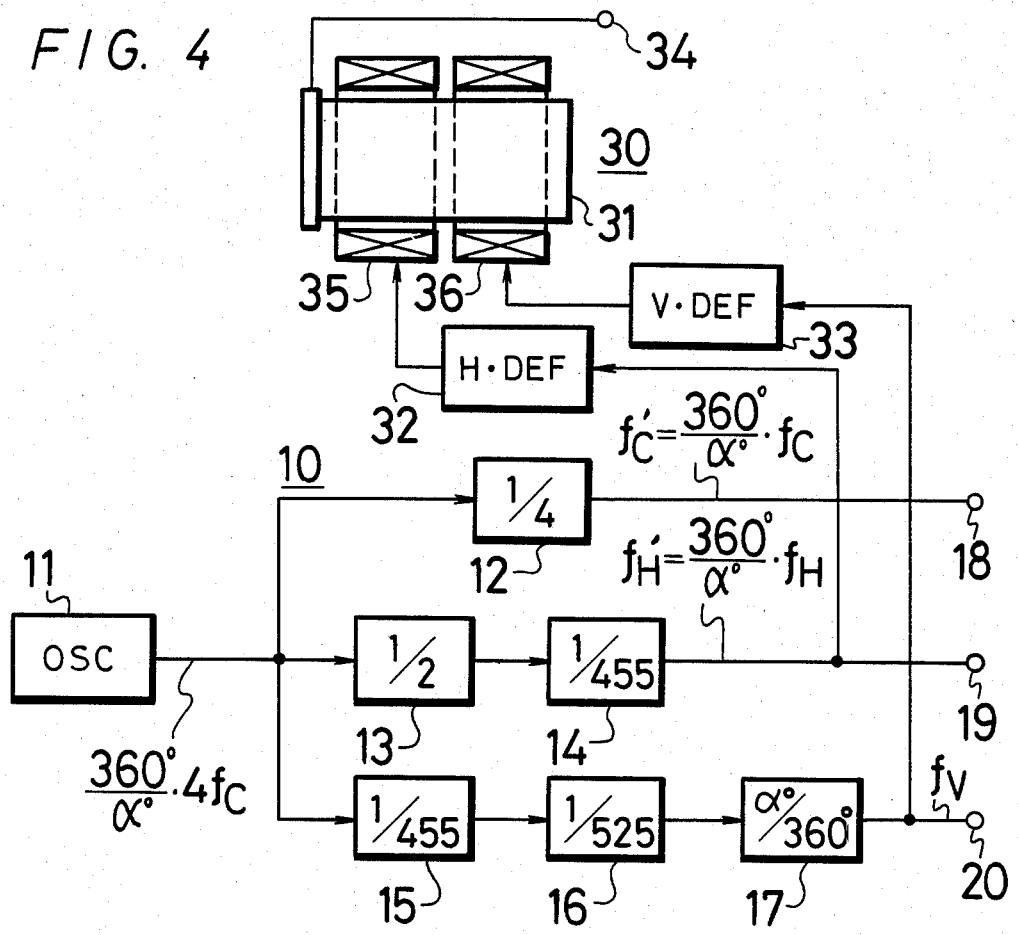
FIG. 4 is a system block diagram of a television camera and associated reference signal generating circuitry for use in combination with the miniature VTR according to this invention.

With reference to the drawings, throughout which similar elements are identified with the same reference characters, and initially to FIGS. 1A and 1B thereof, a recording and reproducing head drum assembly for use in a standard helical scan video tape recorder (VTR) has a rotary head drum 1 of diameter $D_2$ and two magnetic recording heads $H_A$ and $H_B$ mounted 180° apart thereon. A magnetic recording tape 2 is wrapped about the circumferential surface of the drum 1 for a wrap angle of substantially 180° and at a helical angle, or still angle $\theta_1$, as shown in FIG. 1B, relative to the rotational plane of the heads $H_A$ and $H_B$. The tape 2 is drawn in an advancement direction a, while the rotary heads $H_A$ and $H_B$ are rotated in a rotation direction b.

In a standard VTR, the head drum 1 (sometimes called guide drum) is rather large, and any attempts to reduce the overall size of the VTR are limited by the ability to reduce the size of the head drum 1. Accordingly, an embodiment of this invention described herein involves reducing the size of the head drum, while permitting the same to record video signals in a pattern that is compatible with the standard VTR.

As shown in FIGS. 2A and 2B, the miniature VTR has a reduced-diameter rotary head drum 3 with a diameter $D_2$, here selected to be about 3/5 the diameter $D_1$ of the normal-sized head drum 1. The tape is wrapped thereabout for a wrap angle $\alpha$, here approximately 300°. For this purpose, guide rollers 4a and 4b are provided to hold the tape 2 in a so-called omega wrap configuration about the drum 3. The tape 2 is wound at a still angle $\theta_2$, as shown in FIG. 2B.

In this embodiment, the drum 3 has one rotary head H, with a single recording gap thereon, and the one head H is used for recording all the video signals onto the tape 2. However, because the guide rollers 4a and 4b cannot be made coincident, the wrapping angle $\alpha$ must be less than 360° (preferably about 300°) and there is a resulting gap of 360°-$\alpha$ in which the head H is out of contact with the tape 2.

Here, as shown in FIGS. 2A and 2B, the tape 2 is drawn in the advancement direction a while the head H revolves about the head drum 3 in the rotation direction b.

Examples of tape patterns recorded with the standard and the miniature VTRs are shown in FIG. 3A. On the left side of FIG. 3A is illustrated a tape record pattern $P_N$ formed by the standard VTR (FIGS. 1A and 1B); on the right side thereof is illustrated a tape record pattern $P_S$ formed by the miniature VTR with the reduced-diameter head drum 3 (FIGS. 2A and 2B).

In the normal VTR pattern $P_N$, because of the relative motion of the tape 2 and the heads $H_A$ and $H_B$, while the tape 2 and heads $H_A$, $H_B$ proceed in their respective directions a and b, record tracks $T_{N1}$, $T_{N2}$ are formed on the tape 2 at a recording angle $\theta_0$, relative to the direction of advancement a. These tracks have a track length $l_N$. If the tape is not being advanced, still-mode tracks $T_{S2}$, $T_{S3}$ are formed on the tape 2 at the still angle $\theta_1$. Because these tracks $T_{S2}$, $T_{S3}$ are formed due to rotational motion only of the heads $H_A$ and $H_B$ in the direction b, they have a length $l_S$ equal to the circumferential extent of contact of the tape 2 and the drum 1, i.e., $l_S = \pi D_1/2$.

Although it is understood that these tracks $T_{N1}$, $T_{N2}$, $T_{S2}$, and $T_{S3}$ would have a finite width, for the sake of simplicity only the center lines thereof are illustrated.

In order to establish tape compatibility as between the standard VTR and the miniature VTR, the miniature VTR has to form record tracks of the same length $l_N$ and at the same recording angle $\theta_0$ even though the circumferential distance transversed by the head H while in contact with the tape 2 and the still angle $\theta_2$ are different from the corresponding amounts in the standard VTR.

Accordingly, as shown on the right side of FIG. 3A, the tape pattern $P_S$ formed by the miniature VTR has record tracks $T'_{N1}$ and $T'_{N2}$ having a length $l_N'$ and formed at the record angle $\theta_0$. Still mode tracks $T_{S'2}$, $T_{S'3}$ are formed at the still angle $\theta_2$ and have a length $l'_S$ corresponding to the distance traversed by the head H across the tape 2 with the latter wrapped for the wrapping angle $\alpha$ about the head drum 3. Because this angle $\alpha$ is less than 360°, the length $l'_S$ becomes $$l'_S = \alpha \pi D_2/360°.$$

Because the tape 2 is drawn at a speed V in both the normal VTR pattern $P_N$ and the miniature VTR pattern $P_S$, successive tracks $T_{N1}$ and $T_{N2}$ or $T_{N'1}$ and $T_{N'2}$ have a pitch or interval La determined by the relation:

$$L_a = V/f_V$$

where $f_v$ is the vertical frequency (i.e., the field frequency) of the video signal recorded on the tape 2. In the NTSC system (used in North America and Japan) this frequency $f_V$ is about 60 Hz, while in the CCIR system (used, e.g., in Europe) this frequency $f_V$ is 50 Hz.

To form a tape pattern $P_S$ so that the tape 2 recorded by the miniature VTR is compatible with the standard VTR, the wrapping angle $\alpha$, the diameter $D_2$ of the rotary head drum 3, and the still angle $\theta_2$ must be selected to have appropriate values.

The selection of the wrapping angle $\alpha$ will be discussed first.

For any selected wrapping angle $\alpha$ of the tape 2 about the rotary drum 3 the amount of recorded video information during one vertical scanning period to be recorded contained within the track length $l'_N$ must be same as on the standard VTR track length $l_N$. To be more specific, the amount of recorded video information within the track length $l'_N$ is 262.5H in the NTSC system, where H is one horizontal scanning interval, while in a CCIR system, such as the PAL system, video information corresonding to 312.5H is to be recorded within the track length $l'_N$.

Therefore, if the tape 2 is wound around the rotary drum 3 for a wrapping angle of 360°, the amount of the recorded video information at that time is given by $(525/2)+X$ in the NTSC system, and $625/2+Y$ in the CCIR system. If, in both the NTSC system and the CCIR system, the wrapping angle is selected as $\alpha$, where $\alpha$ is less than 360°, a relation as expressed in the following equation (1) is established:

$$(525/2)+X:525/2=(625/2)+Y:625/2=360°:\alpha \tag{1}$$

The number of the horizontal scanning lines corresponding to one rotation of the drum 3 should be an interger for various reasons, such as removal of frame jitter, elimination of a jumping phenomenon between successive field signals, and other problems.

The following relationship (2) is established as between the NTSC and CCIR systems:

$$525:625=21:25 \tag{2}$$

Since 21 and 25 are prime numbers relative to each other, if 2X is taken as 21m and 2Y is taken as 25m (where m is an integer), the wrapping angle $\alpha$ expressed by the following equation (3) can be obtained from the equations (1) and (2).

$$\alpha = \frac{525 \cdot 360°}{525 + 21m} = \frac{625 \cdot 360°}{625 + 25m} = \frac{25 \cdot 360°}{25 + m} \tag{3}$$

The term of the equation (3) left of the second equal sign represents the wrapping angle in the NTSC system and the term to the right hereof represents the wrapping angle in the CCIR system. The equation (3) shows that the wrapping angle $\alpha$ can be selected to be used commonly to the VTRs of the CCIR and NTSC systems.

If integral values $m=1, 2, 3, \ldots$, are put into the equation (3), values of $\alpha$ are obtained for the corresponding values of m. However, due to the structure of the VTR, the wrapping angle $\alpha$ is limited to some extent. That is, if m is selected as a very small integer ($m=1$ or 2), the wrapping angle $\alpha$ becomes large and it becomes difficult to dispose the tape guides 4a and 4b, shown in FIG. 2A, in mechanical connection with the associated rotary drum 3. On the other hand, if m is selected as a large integer, the wrapping angle $\alpha$ becomes small, and the diameter $D_2$ of the rotary drum becomes larger. Therefore, it is preferable that m is selected to be 4 or 5. From a practical standpoint, when m is selected as 4, the wrapping angle $\alpha$ is 310.34°, and when m is selected as 5, the angle $\alpha$ is 300°. In this embodiment, the integer m is selected as 5 so that the wrapping angle $\alpha$ is 300°.

Once the wrapping angle $\alpha$ is selected, the diameter $D_2$ of the rotary drum 3 is determined in conjunction therewith. In other words, in the tape pattern $P_S$ in FIG. 3A, a triangle $\triangle ABC$ formed by connecting points A, B, and C, and the diameter $D_2$ of the reduced diameter drum 3 can be obtained. The points A and B represent the intersections of the extended recording tracks $T_{N'2}$ and $T_{N'1}$ with the extended still mode track $T_{S'2}$. The point C corresponds to the point A, but is disposed one track pitch $L_a$ in advance thereof in the direction of tape advance a.

The cosine theorem can be applied to this triangle $\triangle ABC$, and the relation expressed below can be derived. In other words, if the tape pattern $P_S$ in FIG. 3A is expressed in terms of the angles A, B, C and lengths AB, AC, and BC as shown in FIG. 3B, this relationship becomes:

$$(\pi D_2)^2 = \left(\frac{V}{f_V}\right)^2 + \left(\frac{360°}{\alpha} \cdot l_N\right)^2 - \tag{4'}$$

$$2 \cdot \frac{V}{f_V} \cdot \frac{360° x l'_N}{\alpha°} \cdot \cos(180° - \theta_0)$$

$$= \left(\frac{V}{f_V}\right)^2 + \left(\frac{360°}{\alpha} \cdot l'_N\right)^2 +$$

$$2 \cdot \frac{360° x l'_N}{\alpha} \cdot \frac{V}{f_V} \cos\theta_0$$

Thus, the following equation (4) is obtained:

$$D_2 = \tag{4}$$

$$\frac{1}{\pi}\sqrt{\left(\frac{V}{f_V}\right)^2 + \left(\frac{360°}{\alpha} \cdot l'_N\right)^2 + 2 \cdot \frac{360°}{\alpha} \cdot \frac{l'_N \cdot V}{f_V} \cdot \cos\theta_0}$$

where $f_V$ is the video field frequency.

Using the equation (4), since the tape speed V, the vertical, or field frequency $f_V$, the track length $l'_N$ and the recording angle $\theta_0$ have been previously established, if the wrapping angle $\alpha$ as mentioned above is put into the equation (4), the diameter $D_2$ of the reduced-diameter drum 3 can be calculated.

Now, let is be assumed that the diameter $D_1$ of standard-diameter drum 1 which, for example, satisfies the so-called β tape format is 74.487 mm, the still angle $\theta_1$ is 5°00'00", the tape speed V is 20 mm/sec, and the field frequency $f_V$ is 59.94 Hz. Then, the recording angle $\theta_0$ becomes 5°00'51". If these data are put into the equation (4), the diameter $D_2$ of the drum 3 becomes 44.6724 mm. Thus, the drum diameter $D_2$ can be reduced to about 3/5 of the conventional drum diameter $D_1$.

Next, the still angle $\theta_2$ is obtained. That is, as shown in FIG. 3A, the sine component (i.e., the projection along the effective width of the tape) of the track length $l_S$ of the still-mode rotary track $T_{S2}$ in the normal VTR must equal the sine component of the track length $l'_S$ of the still-mode rotary track $T'_{S3}$ in the miniature VTR. From this fact there can be obtained the following equation (5):

$$\frac{\pi D_1}{2} \sin\theta_1 = \frac{\pi D_2 \alpha}{360°} \sin\theta_2 \tag{5}$$

Thus the still angle $\theta_2$ becomes as expressed by the following equation (6).

$$\theta_2 = \arcsin\left(\frac{180°}{\alpha} \cdot \frac{D_1}{D_2} \cdot \sin\theta_1\right) \quad (6)$$

As described hereinabove, the larger drum diameter $D_1$ is 74.487 mm, the smaller drum diameter $D_2$ is 44.6724 mm, and the still angle $\theta_1$ is 5°. Accordingly, the still angle $\theta_2$ becomes 5°00′08″. In other words, the still angle $\theta_2$ includes a correction amount of substantially eight seconds as compared with the still angle $\theta_1$ of the standard VTR, and this correction amounts corresponds to a displacement of 5 μm. Therefore, in order to obtain this correction amount of 5 μm, the inclination of the tape guides 4a, 4b associated with the drum 3 of the miniature VTR rotary magnetic head assembly is selected appropriately.

Since, as shown in FIG. 2A, the magnetic recording apparatus according to this invention records a signal through one rotary magnetic head H and the tape 2 is wound around the rotary drum 3 over a wrapping angle $\alpha$ of substantially 300°, the same one field of video information as is recorded by the conventional standard VTR in the standard tracks $T_{N1}$, $T_{N2}$ cannot be recorded within the track length $l'_N$, unless there is used a non-standard horizontal scanning frequency $f'_H$ that differs from the standard horizontal scanning frequency $f_H$ utilized with the standard VTR. Consequently, in accordance with this invention, the video signal to be recorded is modified to have the non-standard horizontal scanning frequency $f'_H$ as expressed by the following equation (7):

$$f'_H = (360°/\alpha)f_H \quad (7)$$

Here $f_H$ can represent the standard horizontal scanning frequency of the NTSC system or of a CCIR system, such as the PAL system.

That is, for a particular wrapping angle $\alpha$, an appropriate value of the horizontal frequency $f'_H$ is selected. In like manner, a chrominance subcarrier frequency $f'_c$ for a color subcarrier is selected in the same proportion, i.e., $360°/\alpha$ of the subcarrier frequency $f_c$ used in a standard VTR.

If the horizontal scanning frequency $f'_H$ is selected as expressed by the equation (7), during the period wherein the rotary magnetic head H contacts the tape 2, the video information contained in one video field (for example, signals of 262.5 horizontal periods) can all be recorded. In this case, during the period wherein the rotary drum 3 completes one full revolution is substantially 1/60 second, the equivalent of about 304 horizontal lines of video are supplied to the VTR from a source, such as a television camera. Therefore, when the signal to be recorded is supplied from the television camera, the horizontal scanning frequency supplied to the camera to control the horizontal deflection of the television camera should be chosen to be $f'_H$. Then, when the resulting signal is recorded, it can be completely and accurately reproduced on a standard VTR. Also, if the signal to be recorded is a received broadcast video signal or a video signal reproduced from a standard VTR, the conversion of the standard horizontal scanning frequency $f_H$ to the non-standard frequency $f'_H$ can be easily carried out by writing the video signal at a write in rate into a memory device, such as a charge-coupled device (CCD) or the like, and then by reading the signal out of the memory device at a read-out rate that is faster than the write-in rate by a factor $360°/\alpha$.

FIG. 4 schematically shows an arrangement of one embodiment of reference signal generating apparatus 10. This apparatus is favorably incorporated in a combination television camera and miniature VTR in which the signal from the television camera is supplied to the miniature VTR and is directly recorded on tape by the magnetic recording apparatus according to this invention.

A reference signal oscillator 11 produces at its output terminal a reference oscillation output at a frequency $360°/\alpha \times 4f_c$ (where $f_c$ is the subcarrier frequency of a color subcarrier used with a standard VTR). This reference frequency includes a correction factor corresponding to the wrapping angle $\alpha$. The reference oscillation output from the reference signal oscillator 11 is supplied to a divide-by-four counter 12, in which the subcarrier frequency $f'_c$ with the correction factor as mentioned above derived and which is then delivered to a chrominance subcarrier terminal 18. Similarly, the reference oscillation output is also supplied to a divide-by-two counter 13, and the reference oscillation output divided down in the counter 13 is furnished to another counter 14 to be divided by 455. Consequently, the counter 14 supplies to a horizontal scanning signal output 18 a signal with the non-standard horizontal scanning frequency $f'_H$. The reference oscillation output is further supplied to an input of a divide-by-455 counter 15, whose output is coupled to an input of a divide-by-525 counter 16, and the latter's output is coupled to a frequency-dividing counter 17 to divide by a factor $\alpha/360°$. The counter 17 supplies a vertical synchronizing signal at the field frequency $f_V$ which is the same field frequency as is produced by a standard VTR. This vertical synchronizing signal is supplied to a terminal 20.

Associated television camera apparatus includes a pickup tube 31, and horizontal and vertical deflection circuits 32, 33. An output terminal 34 is connected to a target of the pickup tube 31 and an output television signal appears at this terminal 34. The horizontal and vertical deflecting circuits 32, 33 have outputs connected respectively to horizontal and vertical deflection coils 35, 36 disposed over the pickup tube 31.

The television signal appearing at the output terminal 34 can be supplied directly to the head H of the miniature VTR of this invention to be recorded thereby onto the tape 2.

As described above, with the miniature VTR according to this invention, the tape pattern $P_S$ thereof can be formed perfectly using the reduced-diameter drum 3, and this pattern $P_S$ is the same as the tape pattern $P_N$ formed by the standard VTR; thus tape compatibility as between the standard and miniature VTRs is assured.

Tape recorded by the miniature VTR can be reproduced by the standard VTR, and, vice versa, tape recorded by the standard VTR can be reproduced by the miniature VTR.

Therefore, the magnetic recording apparatus according to this invention is quite suitable for use with a combination of a miniature VTR and television camera assembled together in a single unit. This can be carried out simply by making the horizontal scanning frequency $f'_H$ that is used to drive the television camera 30 coincident with the horizontal scanning frequency $f'_H$ determined in accordance with the wrapping angle $\alpha$ and the diameter $D_2$ of the drum 3 of the VTR to which the camera 30 is directly coupled.

Although the rotary magnetic head H utilized in the above-described embodiment includes a rotary magnetic head having one magnetic gap, as a practical matter a so-called double-azimuth head is preferably employed so that the tape pattern formed thereby can be recorded in a guardband-less tape pattern, for example, of the type frequently utilized in a home VTR. In the standard VTR, the magnetic heads $H_A$ and $H_B$ have different azimuth angles, and the tape pattern can be formed without guardbands between the tracks $T_{N1}$, $T_{N2}$. It is desirable to employ a double azimuth head or the like in the miniature VTR so that the magnetic tracks recorded thereby are identical with the tape pattern of the standard double-azimuth VTR.

Figure 5:
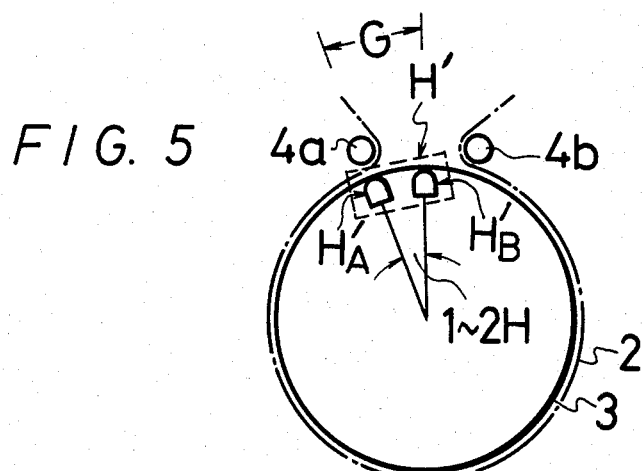
FIG. 5 is a plan view of a reduced-diameter rotary magnetic head assembly associated with a miniature VTR according to another embodiment of this invention.

For example, as shown in FIG. 5, a double-gap head H' has recording gaps $H'_A$, $H'_B$ separated, in the direction of rotation, by an amount G corresponding to between 1H and 2H, where H is the horizontal scanning interval. In this case, the recording gaps $H'_A$ and $H'_B$ are circumferentially disposed in the order in which they are to come into contact with the tape 2. The phase of the vertical synchronizing signal from the television camera is advanced or delayed by a predetermined amount corresponding to the separation G between the gaps, so that any frame jitter or jumping of the signal as between successive fields is avoided, and no disturbance in synchronism appears on the picture screen of an associated television monitor.

As the recording gaps $H'_A$ and $H'_B$ have different azimuth angles, successive recording tracks $T'_{N1}$ and $T'_{N2}$ will be recorded with correspondingly different azimuth angles, as shown in FIG. 5B.

Figure 6:
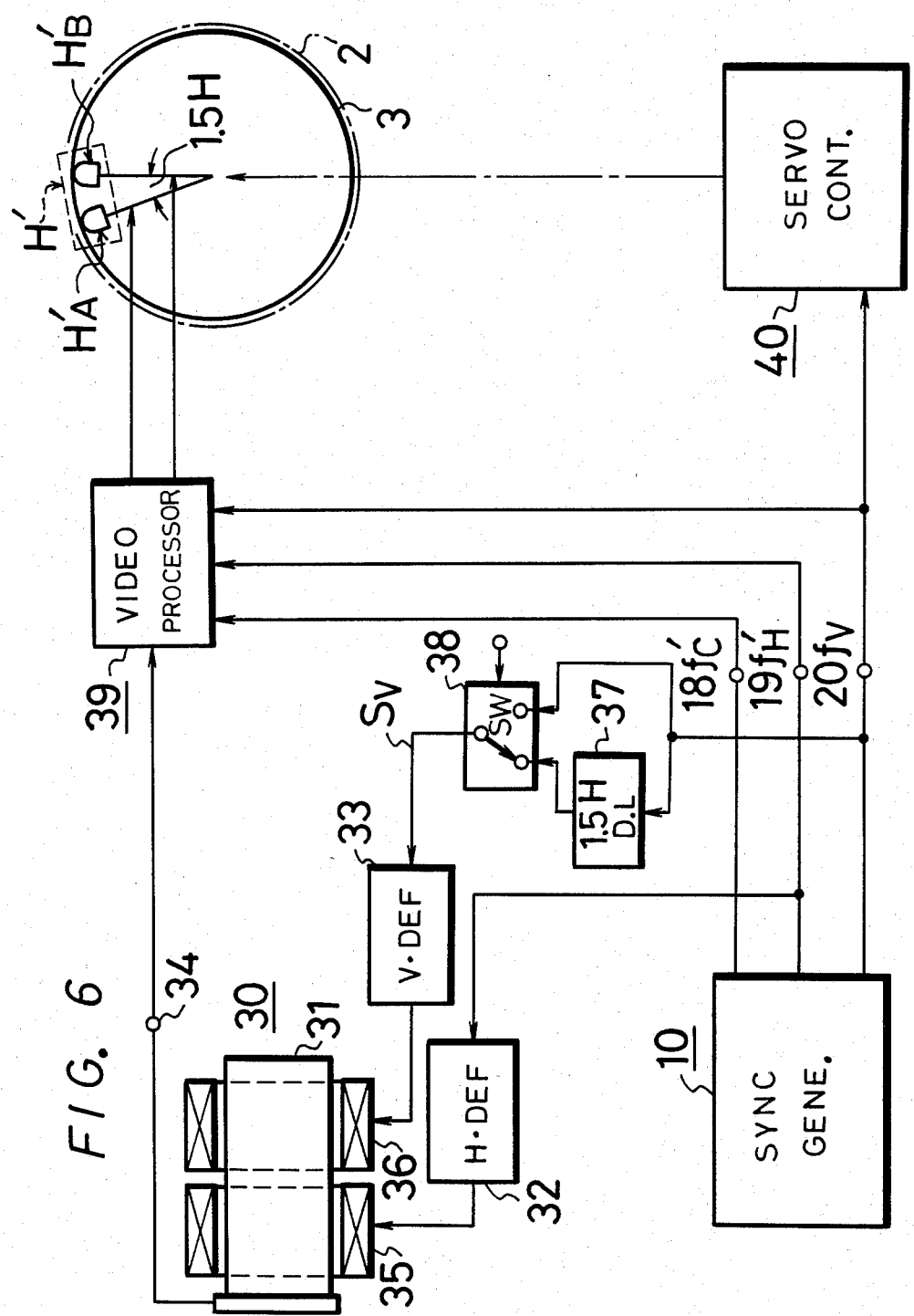
FIG. 6 is a schematic diagram of a combination television camera and miniature VTR employing the magnetic head assembly of FIG. 5.

FIG. 6 shows significant portions of a combination television camera and miniature VTR unit according to an embodiment of this invention in which the double-gap rotary recording head H' is employed. As a result, successive fields of the video signal are recorded on the tape 2 thereby with different azimuth angles in a guardband-less format.

In this embodiment, the recording gaps $H'_A$ and $H'_B$ are separated by an amount G corresponding to 1.5H. The reference signal generating apparatus 10 provides the chrominance subcarrier with the frequency $f'_c$, the horizontal scanning signal with the non-standard horizontal scanning frequency $f'_H$, and the vertical sychronizing signal at the standard field frequency $f_V$ to the output terminals 18, 19, and 20 respectively. The horizontal scanning signal is also supplied to the horizontal deflection circuit 32 of the television camera 30. However, the vertical synchronizing signal is not supplied directly from the generator apparatus 10 to the vertical deflection circuit 33, but is instead supplied to a delay circuit interposed between the generator apparatus 10 and the deflection circuit 33.

The delay circuit is formed of a delay line 37 of a 1.5H delay time, and a switching circuit 38. The delay line 37 has a input coupled to the generator apparatus 10 and an output coupled to an input of the switch 38. The generator apparatus 10 is coupled directly to another input of the switch 38, and an output of the latter is coupled to the vertical deflection circuit 33. The switch 38 is switched over at the field rate, so that the output of the switch 38 supplies to the deflection circuit 33 a modified vertical synchronizing signal $S_V$ in which alternate vertical deflection pulses are delayed by the amount 1.5H corresponding to the separation G of the recording gap $H'_B$ behind the recording gap $H'_A$.

The television signal is supplied from the television output terminal 34 through a video processor circuit 39, to which the chrominance subcarrier, the horizontal scanning signal, and the vertical synchronizing signal are supplied from the terminals 18, 19, 20. The video processor circuit 39 furnishes fields of the processed television signal alternately to the recording gaps $H'_A$ and $H'_B$.

A servo control circuit 40 coupled to receive the vertical synchronizing signal from the terminal 20 controls the rotational speed and phase of the head drum 3.

Because the switch 38 is switched over at the field rate, the fields of television recorded by the recording gap $H'_A$ commence at a time corresponding to the occurrences of the vertical synchronizing signal, but the remaining fields recorded by the recording gap $H'_B$ commence at a time delayed an amount 1.5H thereafter. This permits the production of the television signal to be timed to coincide with the alignment of the respective gaps $H'_A$, $H'_B$ at the beginning of the associated record tracks $T'_{N1}$, $T'_{N2}$.

This can be explained with reference to FIGS. 7A and 7B.

As shown in FIG. 7A, if each rotation of the head H' occurs in 1/60 second (in the NTSC system) each rotation also corresponds to 315 horizontal scanning intervals. However, because of the separation, or stagger between the gaps $H'_A$ and $H'_B$, the odd recording tracks $T'_{N1}$, $T_{N'3}$, etc., scanned by the gap $H'_A$ commence at a predetermined zero reference point of the rotation of the drum 3, but the remaining even tracks $T_{N'2}$, etc., scanned by the gap $H'_B$ commence at a point in the rotation of the head drum 3 separated by the predetermined zero reference point by the amount 1.5H. Accordingly, as shown in FIG. 7B, the modified vertical synchronizing signal $S_V$ has first and second modified field intervals $F_A$ and $F_B$, equal to (1/60 sec.+1.5H) and (1/60 sec.−1.5H), respectively. Thus, successive fields of video are separated by amounts that alternate between 54H and 51H.

The signal produced and recorded in this fashion will result is a tape pattern that is compatible with a standard double-azimuth VTR, and can be reproduced without jitter or noticeable jumping in the reproduced picture.

It is to be understood that the television camera need not be the type requiring magnetic deflection coils, and a camera employing a charge-coupled device (CCD) or other device for a video target could be used instead.

Further, while specific embodiments of this invention have been described hereinabove, it should be understood that the invention is not lmited to those precise embodiments, for many possible modifications and variations thereof will become apparent to those skilled in the art without departure from the scope and spirit of this invention, as defined in the appended claims.

What is claimed is:

1. In helical scan type magnetic recording apparatus having a rotary magnetic head with at least one magnetic gap and disposed on a reduced-size guide drum of a diameter $D_2$ about which a magnetic tape is wound for a wrapping angle $\alpha$ for recording of fields of a video signal having a standard vertical synchronizing frequency $f_V$ in slant tracks on the tape arranged at a recording angle $\theta_0$ with respect to the longitudinal direction of the tape when the tape is advanced at a tape running speed V, with the length of the tracks being $l'_N$, such that the recorded tape is compatible with standard video playback apparatus having a standard-sized rotary drum of diameter $D_1$, greater than the diameter $D_2$, and with the tape being wrapped thereabout for a wrapping angle of substantially 180° and at a still angle of $\theta_1$ with the video signal reproduced from said tape having said standard vertical synchronizing frequency $f_V$ and a standard horizontal scanning frequency $f_H$; the improvement wherein said diameter $D_2$ of the reduced-size guide drum is selected to satisfy the equation $$D_2 = \frac{1}{\pi} \sqrt{\left(\frac{360°}{\alpha} \cdot l'_N\right)^2 + \left(\frac{V}{f_V}\right)^2 + 2 \cdot \frac{360°}{\alpha} \cdot \frac{l'_N V}{f_V} \cos\theta_0} \; ;$$

the tape is wrapped about the reduced-size guide drum at a still angle of $\theta_2$ selected to satisfy the equation $$\theta_2 = \arcsin\left(\frac{180°}{\alpha} \cdot \frac{D_1}{D_2} \cdot \sin\theta_1\right) ;$$

and means are provided to produce the video signal to be recorded by the apparatus having the reduced-size guide drum with a non-standard horizontal scanning frequency $f'_H$ selected to satisfy the equation $$f'_H = \frac{360°}{\alpha} f_H.$$

2. Helical scan type magnetic recording apparatus according to claim 1, wherein said wrapping angle $\alpha$ is selected to satisfy the equation $$\alpha = \frac{25}{25 + m} \cdot 360°$$

where m is a positive integer.

3. Helical scan type magnetic recording apparatus according to claim 2, wherein said integer m is selected from the group consisting of m=4 and m=5.

4. In combination, a video camera and helical scan type magentic recording apparatus according to claim 1, said video camera and said apparatus being constructed integrally as a unit, with the video camera supplying a video signal to the rotary magnetic head of said apparatus to recorded said video signal on said magnetic tape.

5. The combination video camera and helical scan type magnetic recording apparatus as recited in claim 4, further comprising reference signal generator means furnishing reference vertical synchronizing signals to both said camera and said apparatus, and furnishing reference horizontal synchronizing signals at said non-standard horizontal scanning frequency $f'_H$ to said camera to control the rate of line scanning thereof.

6. The combination video camera and helical scan type magnetic recording apparatus as recited in claim 5, wherein said camera includes a horizontal line scanning circuit and a vertical scanning circuit, with said horizontal synchronizing signals and said vertical synchronizing signals being furnished respectively thereto from said reference signal generator means.

7. In helical scan type magnetic recording apparatus having a rotary magnetic head, said at least one head including a first recording gap at one predetermined azimuth angle and second recording gap at another, different predetermined azimuth angle, said first and second gaps being separated from one another by a predetermined spacing and used alternately for recording a video signal in alternate slant tracks on a magnetic tape, said at least one head being disposed on a reduced-size guide drum of a diameter $D_2$ about which said magnetic tape is wound for a wrapping angle $\alpha$ for recording of fields of said video signal with a vertical synchronizing signal having a standard vertical synchronizing frequency $f_V$ in said slant tracks on the tape arranged at a recording angle $\theta_0$ with respect to the longitudinal direction of the tape when the tape is advanced at a tape running speed $V_1$ with the length of the tracks being $l'_N$ such that the recorded tape is compatible with standard video playback apparatus having a standard-size rotary drum of diameter $D_1$, greater than the diameter $D_2$, and with the tape being wrapped thereabout for a wrapping angle of substantially 180° and at a still angle of $\theta_1$ with the video signal reproduced from said tape having the standard vertical synchronizing frequency $f_V$ and a standard horizontal scanning frequency $f_H$; the improvement wherein said diameter $D_2$ of the reduced-size guide drum is selected to satisfy the equation $$D_2 = \frac{1}{\pi} \sqrt{\left(\frac{360°}{\alpha} \cdot l'_N\right)^2 + \left(\frac{V}{f_V}\right)^2 + 2 \cdot \frac{360°}{\alpha} \cdot \frac{l'_N V}{f_V} \cos\theta_0} \; ;$$

the tape is wrapped about the reduced-size guide drum at a still angle of $\theta_2$ selected to satisfy the equation $$\theta_2 = \arcsin\left(\frac{180°}{\alpha} \cdot \frac{D_1}{D_2} \cdot \sin\theta_1\right) ;$$

the video signal to be recorded by the apparatus having the reduced-size guide drum has a non-standard horizontal scanning frequency $f'_H$ selected to satisfy the equation $$f'_H = \frac{360°}{\alpha} f_H ;$$

and the apparatus includes delay means delaying said vertical synchronizing signal and the associated field of the video signal for alternate fields thereof by an amount corresponding to the predetermined spacing between said first and second recording gaps.

8. In combination, a video camera and helical scan type magnetic recording apparatus according to claim 7, said video camera and said apparatus being constructed integrally as a unit, with the video camera supplying said video signal to the at least one rotary magnetic head of said apparatus to record said video signal on said magnetic tape.

9. The combination video camera and helical scan type magnetic recording apparatus as recited in claim 8, further comprising reference signal generating means furnishing reference vertical synchronizing signals to both said camera and said apparatus, and furnishing reference horizontal synchronizing signals at said non-standard horizontal scanning frequency $f'_H$ to said camera to control the rate of line scanning thereof.

10. The combination video camera and helical scan type magnetic recording apparatus as recited in claim 9, wherein said camera includes a horizontal line scanning circuit with said horizontal synchronizing signals being furnished thereto, and a vertical scanning circuit, with said delay means being interposed between said reference signal generating means and said vertical scanning circuit to impart delays of said corresponding amount to alternate ones of said reference vertical synchronizing signals, with the resulting alternately-delayed vertical synchronizing signals being applied to said vertical scanning circuit.

11. The combination video camera and helical scan type magnetic recording apparatus as recited in claim 10, wherein said apparatus further comprises head drum servo means controlling the rotation of said reduced-size head drum with said at least one rotary head thereon on the basis of said reference vertical synchronizing signals, and being coupled to said reference signal generating means in advance of said delay means for receiving the undelayed reference vertical synchronizing signals therefrom.

12. The combination video camera and helical scan type magnetic recording apparatus as recited in claim 7, wherein said predetermined spacing between said first and second recording gaps is between 1H and 2H, where H is the distance traversed by said at least one head during one horizontal scanning interval.

* * * * *